United States Patent [19]

Dholakia et al.

[11] 4,355,382
[45] Oct. 19, 1982

[54] APPARATUS FOR SHARPENING A CUTTING STYLUS

[75] Inventors: Anil R. Dholakia, East Windsor, N.J.; Charles J. Buiocchi, Levittown, Pa.

[73] Assignee: RCA Corporation, New York, N.Y.

[21] Appl. No.: 220,091

[22] Filed: Dec. 24, 1980

[51] Int. Cl.³ .................. C23C 15/00; B24C 1/04; G11B 3/00
[52] U.S. Cl. .................................. 369/71; 51/262.1; 51/410; 204/192 E; 219/121 EJ; 219/121 EM
[58] Field of Search .............. 51/262.1, 410; 369/71; 219/121 EH, 121 EJ, 121 EM; 204/192 E, 192 N

[56] References Cited

U.S. PATENT DOCUMENTS

| | | | |
|---|---|---|---|
| 3,842,194 | 10/1974 | Clemens | 178/6.6 A |
| 4,035,590 | 7/1977 | Halter | 179/100.41 P |
| 4,044,379 | 8/1977 | Halter | 358/128 |
| 4,085,022 | 4/1978 | Wechsung et al. | 219/121 EJ |
| 4,287,689 | 9/1981 | Mindel et al. | 369/71 |

Primary Examiner—Steven L. Stephan
Attorney, Agent, or Firm—E. M. Whitacre; W. H. Meise; J. E. Roehling

[57] ABSTRACT

Apparatus for sharpening a diamond cutting stylus for use in recording video signal information in a metal master includes a source of high energy particles such as an ion milling machine. The high energy source provides a beam of high energy particles having a cross-sectional area perpendicular to the longitudinal axis of the beam that is large compared to a given area on a mounting face of the stylus which is to be bombarded by the beam during the sharpening operation. Further, the apparatus includes a masking block for masking a first portion of the cutting stylus. The masking block is positioned with respect to the high energy source to intercept the particles in the beam directed at the first portion of the cutting stylus. A second portion of the cutting stylus which includes the given area is exposed to the high energy particles such that the second portion of the cutting stylus is removed.

3 Claims, 5 Drawing Figures

APPARATUS FOR SHARPENING A CUTTING STYLUS

This invention relates to an apparatus for sharpening a stylus and, more particularly, to an apparatus for sharpening a diamond cutting stylus which is to be used in a mastering process to produce high density information records, such as video disc records of the type described in U.S. Pat. No. 3,842,194 to J. K. Clemens.

The Clemens' patent discloses a video disc for use with a playback system of the variable capacitance type. In one configuration of the Clemens' system, information representative of recorded picture and sound is encoded in the form of a relief pattern in a relatively fine spiral groove on the surface of a disc record. For example, groove widths of approximately 2.6 micrometers and groove depths of about 0.5 micrometers may be used. During playback, capacitive variations between a conductive electrode on a stylus and a conductive property of the disc record are sensed to recover the prerecorded information.

In accordance with the Clemens' format, the video information my be recorded as relatively short (e.g., 0.6–1.6 micrometers) relief variations along the length of the spiral groove. Illustratively, the method of recording may be of a type shown in U.S. Pat. No. 4,044,379 to J. B. Halter. Pursuant to the Halter method, an electromechanically-driven stylus (e.g., of diamond) having a triangular shape, responsive to a combined video and audio signal, records the relatively short geometric variations, representative of the time variations of the signal, on a surface of a metal substrate. After the electromechanical recording operation, the recorded surface of the metal substrate has a relief pattern corresponding to that which is desired in the final record. In the replicating process, masters are made from the substrate. Molds are the made from the masters and stampers are made from the molds. The stampers are used in the process of pressing a vinyl record having the desired relief pattern.

In order to record the fine groove and signal structure typically employed in video discs, the recording stylus must cut the groove and signal information without tearing, smearing, chattering, ripping or chipping the surface of the metal substrate during the recording process. The geometric variations along the length of the groove should be a substantially accurate representation of the modulated signals recorded thereon. Bearing in mind the extremely dense nature of the information recorded in the groove structure of the video disc, it will be appreciated that the generation of substrates of acceptable quality is critical in the record mastering process. Any significant incidence of machining imperfections in the finished surface results in a substrate which is not acceptable in the manufacturing or records having such a dense information content.

It has been discovered that only hard materials (e.g., diamond) are acceptable for video recording styli and, further, that the cutting edges of the styli must be extremely sharp to produce substrates to such demanding standards. Sharpening styli used to cut substrates in accordance with these standards presents unique problems.

The stylus structure used to record information on metal substrates according to the Halter Method is extremely small. As noted above the signal element and groove structure cut on the master substrate is extremely fine. Further, the video bandwidth (e.g., 0–3 MHz) and modulating frequencies (e.g., up to 6.3 MHz) necessitate the use of an electromechanical cutterhead having a low mass. Generally, a low mass cutterhead has a principle resonant frequency at the upper end of the bandwidth. To provide a stylus suitable for cutting the fine signal structure and having the low mass necessary to operate at video frequencies requires that the stylus structure be miniature in size as compared to styli used in other recording systems, such as audio recording.

Cutting styli suitable for use in electromechanical recording of video information are very expensive. The process of manufacturing a new stylus from a rough diamond is tedious. It requires grinding and polishing of several facets. The present invention provides an apparatus for use in resharpening styli which have become unusable after some period of use in the electromechanical recorder. The size of the stylus and necessity for sharp cutting edges affects the methods of handling. During stylus resharpening, problems arise with respect to orienting the stylus for the sharpening operation and holding it during sharpening.

In accordance with the principles of the present invention an apparatus for sharpening cutting styli used for video recording is provided. The apparatus includes a source of high energy particles which is directed such that the emitted particle beam impinges on an unmasked region of stylus which is to be removed during resharpening. In the sharpening process the unmasked portion of the stylus is removed thus providing a stylus having the sharp edges necessary for video recording.

In accordance with one aspect of the present invention, an apparatus for sharpening a cutting stylus having a mounting face and a cutting face is provided. The cutting face of the stylus is used to cut video signal information in a metal master. A source of high energy particles provides a beam of particles having a cross-sectional area perpendicular to its longitudinal axis that is large compared to a given area on the mounting face which is to be removed during sharpening of the stylus. A mask is provided for masking a first portion of the cutting stylus. The mask is positioned to intercept the particles in the beam which are directed at the first portion of the cutting stylus. A second portion of the stylus which includes the given area is exposed to the particles in the beam, thus the second portion of the cutting stylus is removed by the bombarding particles.

In accordance with another aspect of the present invention, the apparatus for sharpening the cutting stylus includes a masking block. In this apparatus the cutting stylus is affixed to the masking block such that the cutting face of the cutting stylus is parallel to a substantially flat surface of the masking block and offset by approximately 1 to 2 micrometers. Further, the apparatus includes a source providing a beam of high energy particles. The stylus and the mask are positioned in the beam path such that the offset portion of the stylus is exposed to the high energy particles while the remaining portion of the stylus is masked from exposure by the high energy particles. In this arrangement the exposed portion of the cutting stylus is bombarded with the high energy particles for a period of time sufficient to remove the exposed portion.

In one embodiment of the apparatus described above, an alignment plate is provided. In this apparatus the masking block is positioned on a flat surface of the alignment plate such that the substantially flat surface of the masking block is parallel to and spaced from the flat surface of the alignment plate. The cutting stylus is oriented such that its cutting face is parallel to the flat surface of the alignment plate and a second surface of the cutting stylus is adjacent to a second surface of the masking block. In this arrangement the cutting stylus is adhesively attached to the masking plate.

Other features and advantages of the invention will be more fully understood from the following detailed description of the prefrred embodiment, the appended claims and accompanying drawing in which:

Figure 1:
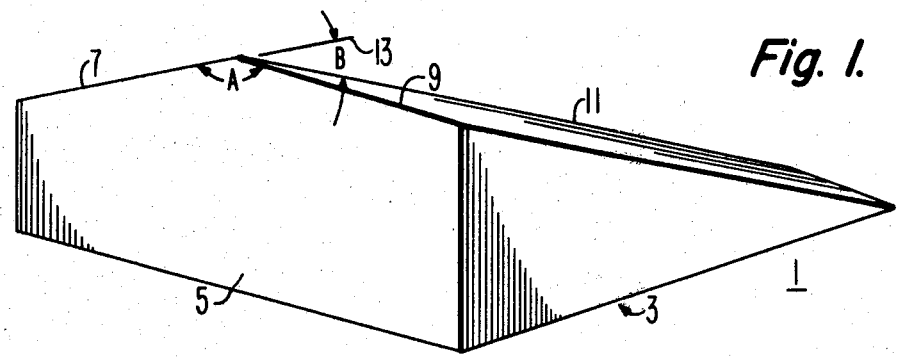
FIG. 1 is a perspective view of a cutting stylus used for cutting a video disc record substrate.

Referring to FIG. 1, a perspective view of a cutting stylus 1 formed of an extremely hard material (illustratively, diamond) is shown. In an electromechanical cutting operation the cutting stylus is mounted by base 3 in a cutterhead assembly to a piezoelectric element of the cutterhead. A cutterhead for electromechanically recording a video signal in a metal master is described in U.S. Pat. No. 4,035,590, issued to J. B. Halter on July 12, 1977, and entitled, "Apparatus for Electromechanical Recording of Short Wavelength Modulation in a Metal Master". Illustratively, cutting styli used for cutting signal information for a Clemens' type record have physical dimensions of a cube having approximately 150 μm sides.

A cutting face 5 is formed on cutting stylus 1 at an angle of 90 degrees to the plane of base 3. The included angle A of the cutting stylus 1 is the angle subtended between the cutting edges 7 and 9 of the stylus. The shape of cutting edges 7 and 9 as illustrated in FIG. 1 will form a triangular groove in a recording master. It should be appreciated by those of skill in the art that other groove shapes and styli shapes are equally included within the scope of the present invention. The clearance angle B of the cutting stylus 1 is the angle subtended by the trailing edge 11 of the cutting stylus 1 with imaginary line 13 which represents the line of motion of the cutting stylus with respect to a recording master during the cutting operation.

Short wavelength variations of approximately 0.6 micrometers are cut on the inside diameter (illustratively, 17 centimeters) of the recording master while recording a high signal frequency (illustratively, 6.3 Mhz) at a recording speed of 450 rpm. A peak-to-peak groove modulation of approximately 0.1 micrometer provides an adequate signal-to-noise ratio for video discs generated from a metal substrate cut with cutting stylus 1. A groove modulation having a peak-to-peak dimension of 0.1 micrometer and a wavelength of 0.6 micrometer will have a maximum slope at its zero crossing of approximately 28 degrees. The trailing edge of the cutting stylus 1, therefore, must have a slope greater than 28 degrees in order to avoid interference with previously recorded groove modulation in the region of maximum slope at the innermost diameter while recording the highest signal frequency. Forming a flaw-free cutting edge with a clearance angle of greater than 28 degrees on a diamond stylus of the dimensions discussed herein present practical problems of alignment, orientation and edge sharpness. The apparatus according to the present invention tends to solve these problems.

Figure 2:
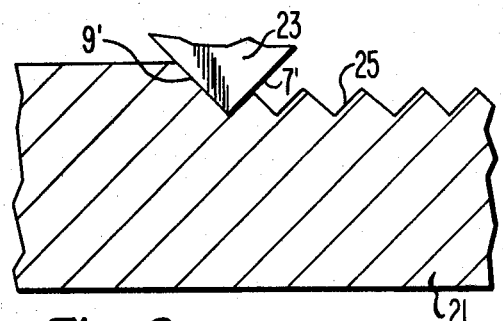
FIG. 2 shows a cross-sectional view of a portion of a video disc substrate being cut by a cutting stylus.

Referring to FIG. 2 a cross-secton of a disc-shaped substrate 21 is shown. During the recording operation stylus tip 23 engages the disc surface and cuts a spiral, V-shaped groove 25. In one embodiment, the leading edge 9' of the stylus cuts deeply into the substrate surface while the trailing edge 7' of the stylus cuts at the depth of the groove. Illustratively, the groove depth is approximately 0.5 micrometers. During recording the stylus is driven up and down by a piezoelectric driver in consonance with the video information to cause a peak-to-peak variation of the groove depth, illustratively the peak-to-peak variation is 850 Angstroms. These peak-to-peak variations of groove depth are representative of the undulations in the final record.

Figure 3:
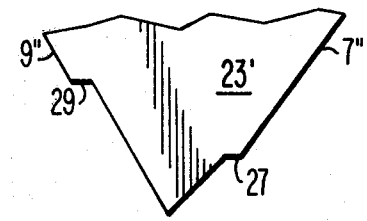
FIG. 3 shows an enlarged view of the tip of a worn cutting stylus.

An enlarged view of the cutting tip 23' of a used cutting stylus is shown in FIG 3. In this view the leading and trailing cutting edges 9" and 7" respectively are illustrated with ridges 29 and 27. The ridges 27 and 29 which are worn into the stylus face during the cutting operation should be removed during the sharpening operation. Illustrative, a slice of approximately 1–2 micrometers parallel to the cutting face may have to be removed to eliminate the ridges from the cutting surface.

Figure 4:
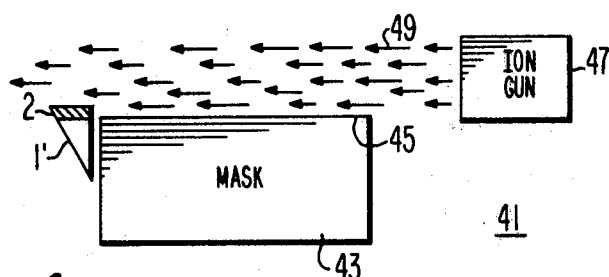
FIG. 4 is a view of an apparatus embodying the principles of the present invention.

Referring to FIG. 4, apparatus 41 for sharpening a cutting stylus is shown. Stylus 1' is positioned on a mask 43 such that slice 2 is offset above flat surface 45 of mask 43. Stylus 1' affixed to mask 43 (which, illustratively, may be formed of diamond) is positioned such that the high energy particles 49 from ion gun 47 bombard slice 2. Stylus 1' is exposed to beam 49 of ion gun 47 until slice 2 is milled away. In this arrangement the exposed part of stylus 1', i.e., slice 2, is slowly milled away. After the ion milling operation that portion of the stylus which was masked by the masking diamond includes a new cutting face 5 having substantially flaw-free cutting edges 7 and 9 in accordance with the details of FIG. 1.

The rate at which slice 2 is removed is a function of the angle of incidence at which the ion particles bombard the surface of the slice. The maximum material removal occurs when the ion beam is incident on a surface at an angle of 45°. The removal rate decreases to a minimum as the incident angle approaches 0° or 90°. Thus, if the slice is examined during the milling process it will be appreciated that the removal process starts at the leading edge of slice 2 and takes material off at a generally 45° angle until the slice is eroded away. Illustratively, the removal process takes approximately 24 hours when the ion mill anode current is at 150 μamp and the operating voltage is 56 KV.

Figure 5:
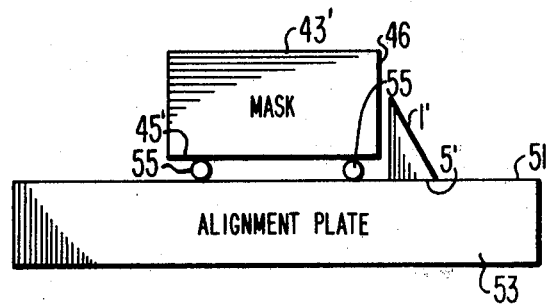
FIG. 5 is a view of an alignment apparatus used for positioning the stylus on the masking block in accordance with the principles of the present invention.

Use of the apparatus of FIG. 5 permits the stylus 1' to be oriented onto the masking block 43' prior to the ion milling operation. Mask 43' is positioned parallel to a flat surface 51 of alignment plate 53. A pair of spacer blocks 55 is interposed between surface 51 and surface 45' of masking block 43'. Cutting stylus 1', which is arranged with cutting face 5' against surface 51, is pushed against mounting surface 46 of masking block 43' onto which a drop of epoxy resin has been applied (not shown). The cutting stylus is checked to make certain that cutting face 5' is resting squarely on surface 51. Additional epoxy resin may be added to secure the cutting stylus to the masking block. Advantageously, surface 51 of alignment block 53 is formed of a nonadhesive material so that the masking block and stylus may be removed from the alignment plate even if some epoxy resin overflows onto surface 51.

With stylus 1' affixed to masking block 43' the stylus and mask may be positioned in the path of ion mill 47 for the sharpening operation. Illustratively, the spacer blocks 55 are chosen to be the thickness of slice 2 which is to be removed. For example, spacer blocks 55 may be 1–2 micrometers thick.

What is claimed is:

1. A method for sharpening a cutting stylus for use in cutting geometric variations representing video signal information in a metal substrate, said method including the steps of:
    affixing said cutting stylus to a masking block, said cutting stylus being affixed to said masking block such that a first given portion of said cutting stylus is shielded from a beam of high energy particles during a subsequent irradiation step;
    providing a beam of high energy particles, said beam of high energy particles having a cross-sectional area perpendicular to the longitudinal axis of said beam that is large compared to a second given portion of said cutting stylus;
    positioning said cutting stylus affixed to said masking block in the path of said beam of high energy particles such that said first given portion of said cutting stylus is shielded from said beam of high energy particles; and
    irradiating said cutting stylus affixed to said masking block for a period of time sufficient to remove said second given portion of said stylus whereby said cutting stylus is sharpened.

2. The method according to claim 1 wherein the affixing step includes:
    positioning a spacer on a surface of an alignment plate;
    placing said masking block on said spacer such that said masking block is spaced from said surface of said alignment plate by a given dimension;
    positioning a first surface of said cutting stylus against said surface of said alignment plate and a second surface of said cutting stylus agaisnt a surface of said masking block; and
    joining said cutting stylus to said masking block.

3. The method according to claim 2 wherein said given dimension is approximately 1–2 micrometers.

* * * * *

UNITED STATES PATENT AND TRADEMARK OFFICE
CERTIFICATE OF CORRECTION

PATENT NO. : 4,355,382
DATED : October 19, 1982
INVENTOR(S) : Anil Ramniklal Dholakia et al.

It is certified that error appears in the above-identified patent and that said Letters Patent is hereby corrected as shown below:

Col. 3, line 10 : "prefrrd" should be -- preferred --

Col. 3, line 55 : "Mhz" should be -- MHz --

Col. 4, line 54 : "56KV" should be -- 6KV --

Col. 6, line 19 : "agaisnt" should be -- against --

Signed and Sealed this

Twenty-first Day of December 1982

[SEAL]

Attest:

GERALD J. MOSSINGHOFF

Attesting Officer  Commissioner of Patents and Trademarks